F. MALTON.
MACHINE FOR CUTTING OUT ARTICLES FROM METAL SHEETS OR BARS.
APPLICATION FILED APR. 9, 1910.

972,203.

Patented Oct. 11, 1910.
3 SHEETS—SHEET 1.

F. MALTON.
MACHINE FOR CUTTING OUT ARTICLES FROM METAL SHEETS OR BARS.
APPLICATION FILED APR. 9, 1910.

972,203.

Patented Oct. 11, 1910.

3 SHEETS—SHEET 2.

WITNESSES

INVENTOR
Frank Malton

UNITED STATES PATENT OFFICE.

FRANK MALTON, OF BIRMINGHAM, ENGLAND, ASSIGNOR TO WARNE, WRIGHT & ROWLAND LIMITED, OF BIRMINGHAM, ENGLAND.

MACHINE FOR CUTTING OUT ARTICLES FROM METAL SHEETS OR BARS.

972,203.      Specification of Letters Patent.      Patented Oct. 11, 1910.

Application filed April 9, 1910. Serial No. 554,353.

*To all whom it may concern:*

Be it known that I, FRANK MALTON, a subject of Great Britain, residing at Nos. 56–59 Watery Lane, Birmingham, England, have invented new and useful Improvements Relating to Machines for Cutting Out Articles from Metal Sheets or Bars, of which the following is a specification.

This invention has for its object to construct an improved machine for cutting out such articles as nuts, washers and the like from metal sheets and bars.

The invention comprises the arrangement of the cutting out tools so that the blank or article produced is removed or severed in an upward direction from the original sheet or bar, and the employment with the upper tool or tools of stripping and delivering devices which respectively release the blank or the like and remove it away from the machine during the idle movements of the tools.

Figure 1:
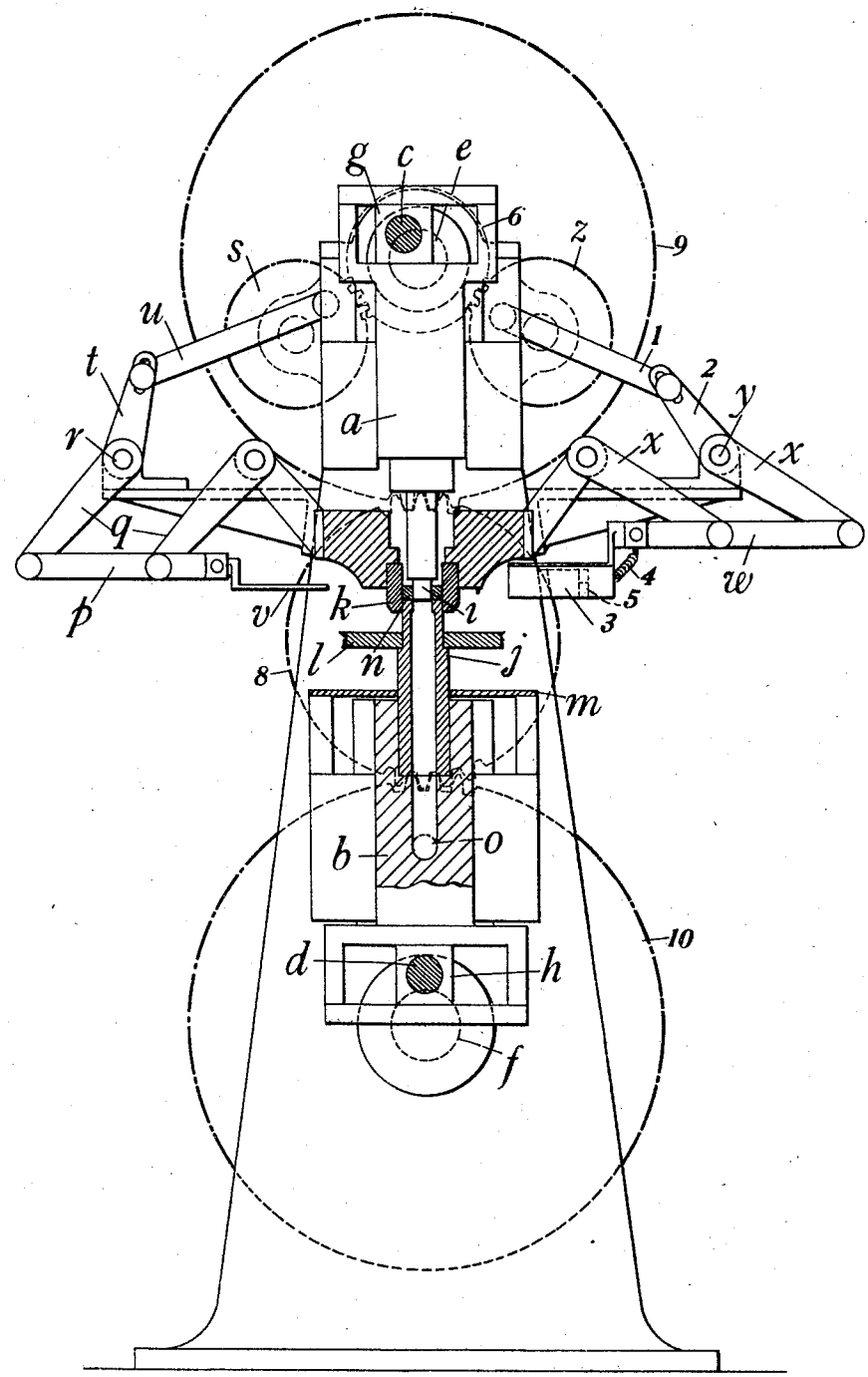
Figure 2:
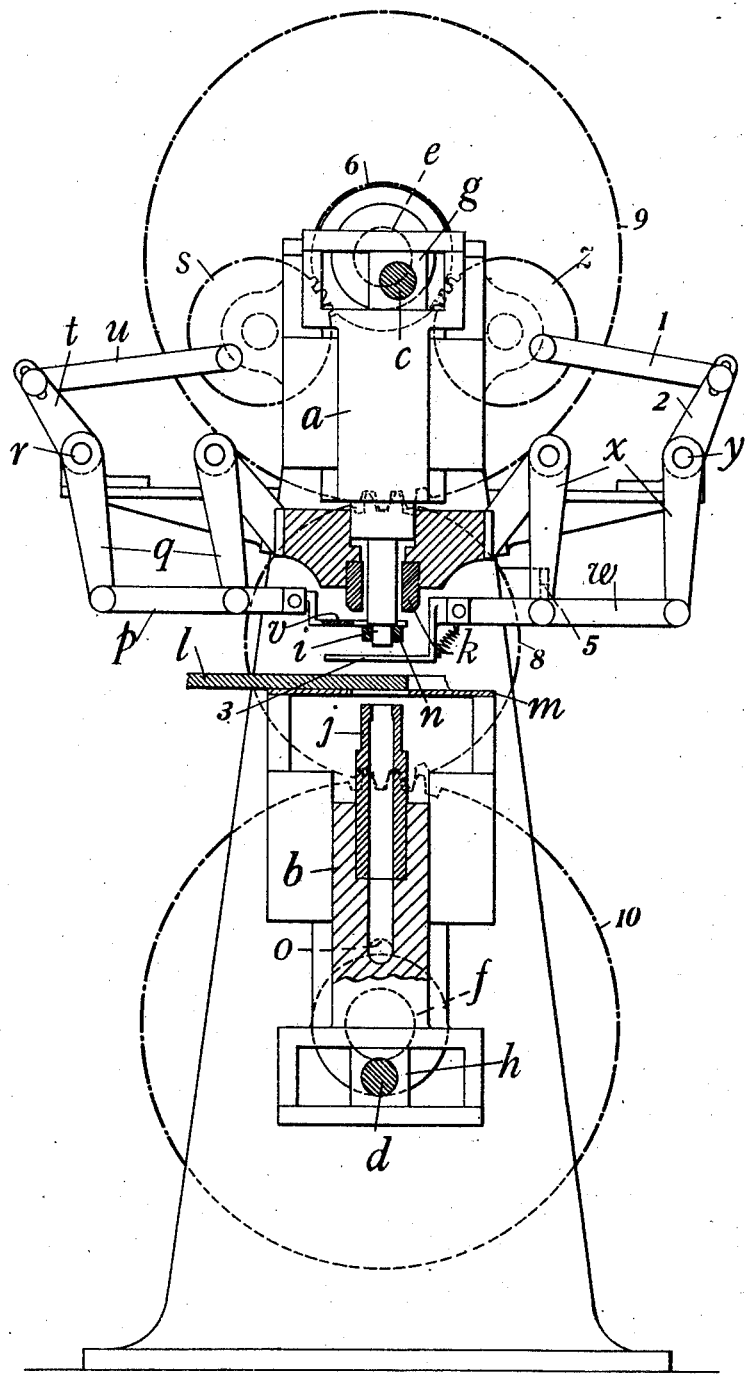
Figure 3:
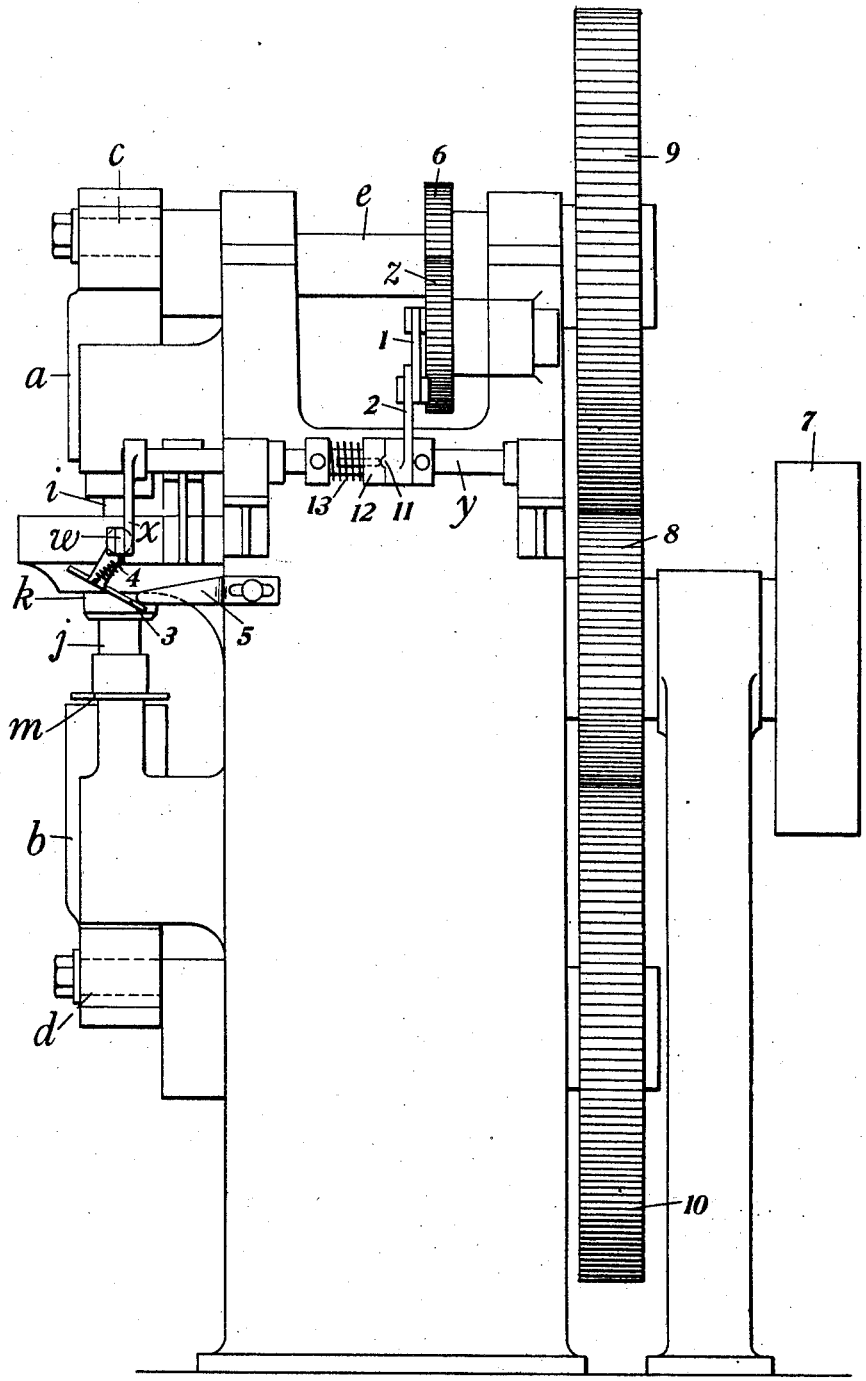

Referring to the three accompanying sheets of explanatory drawings:—Figures 1 and 2 are part sectional front elevations, with the working parts in different operative positions, of a machine constructed in accordance with this invention; the tools being shown disproportionately large in comparison with the rest of the machine for clearness of illustration. Fig. 3 is a side elevation of the machine.

The same references in the different views indicate the same parts.

In carrying the invention into effect a pair of vertical reciprocating slides $a$ and $b$ are employed for carrying the tools. The slides are driven by cranks or cams which are rotated from shafts geared together so that the motions of the slides synchronize or move in a constant relationship. As shown in the drawings cranks $c$ and $d$ are used, the crank $c$ being formed at one end of the crank shaft $e$ and the crank $d$ at one end of the crank shaft $f$. The cranks operate on sliding blocks $g$ and $h$ situated in transverse guides on the slides $a$ and $b$. On the upper slide is secured a punch $i$ for producing the central aperture in the nut or washer, and on the lower slide is secured a hollow punch $j$ which serves both to co-act with the upper punch and also with a fixed inverted die $k$ mounted on the machine frame. The plate $l$ or bar is lifted by the punch $j$ into contact with the die $k$ at each operation. After the blank has been severed the plate falls as far as the punch will permit as shown in Fig. 1. Between the operative movements of the tools the plate or bar rests on a stationary support $m$. The timing of the action of the tools is such that the blank is first cut out from the sheet or bar by the outer edge of the lower punch $j$ and the stationary die $k$, and afterward the central aperture is formed in the blank by the action of the upper punch $i$ and the inner edge of the lower punch $j$. A severed blank is indicated by $n$ in Figs. 1 and 2.

The metal pieces removed from the center of the blank fall away through the lower punch and an aperture $o$ in the lower slide whence they drop out at the front of the machine. The blanks themselves adhere to the upper punch and require to be removed mechanically. For this purpose the following mechanism is employed. At one side of the die $k$ is arranged a horizontal arm $p$ carried by a pair of parallel levers $q$ one of which is secured to a shaft $r$ which is rocked from a crank disk $s$ or eccentric through another lever $t$ and connecting rod $u$, for the purpose of imparting a lateral swinging motion to the arm. One end of the arm is forked or provided with a forked attachment piece $v$ adapted to pass along each side of the upper punch $i$ when the latter projects beyond the lower surface of the die $k$. This arm is termed hereafter the stripping arm. The arm $w$ at the opposite side of the die $k$ to the stripping arm is mounted on parallel levers $x$ one of which is secured to a shaft $y$ and is actuated similarly to the arm $p$ from a crank disk $z$ through a connecting rod 1 and lever 2. The said arm $w$ is, however, provided at its inner extremity with a plate 3 which is adapted to turn on the arm against the action of a spring 4. During the movement of the arm $w$ (or the delivering arm) in an outward direction the plate presses against a fixed abutment piece 5 on the machine frame and is caused thereby to rock relatively to the arm. The crank disks $s$ and $z$ are formed as spur wheels and are rotated from a wheel 6 on the shaft $e$. The operation of the arms is such that both advance toward the tools while the latter are moving downward. During such movement the blank is carried out of the die $k$ by a shoulder on the upper tool. When the said tool nears the end of its downward movement the forked piece $v$ of the stripping arm *p* passes along each side of the tool between the blank and the under surface of the die *k* as shown in Fig. 2. During the upward movement of the tool the forked end strips the blank off the tool and enables it to fall away. Meanwhile the plate 3 of the delivering arm *w* has been advanced into a position beneath the upper tool so that it catches the falling blank. Upon the outward movements of the arms the plate 3 of the delivering arm is rocked and the nut is allowed to slide off into a receptacle at the side of the machine. During the said outward or receding movements of the arms the tools again come into operation and sever another blank from the plate or bar. The relative positions of the parts at the end of the upward movement of the tools after a blank has been severed from the plate or bar is shown in Fig. 1.

When thick nut blanks are being produced the die may be constructed slightly above the cutting edge to produce a smoothing action on the sides of the blank. But in the cutting out of washers, thin nuts, and other like articles, the punches and die are made to any other ordinary form.

Motion is transmitted to the machine from a belt pulley 7 through gear wheels 8, 9 and 10, the two latter being mounted on the ends of the shafts *e* and *f*.

To prevent injury to the machine in the event of obstruction from any cause whatever to the proper movements of the arms *p* and *w* a yielding connection is provided between the levers *t* and 2 and their respective shafts *r* and *y*. Such connection is effected by forming on the boss of each lever *t* and 2 a radial projection 11 which engages a corresponding recess in a collar 12 keyed to the shaft *r* or *y*. The collar is pressed against the lever boss by the action of a spring 13. The engagement afforded by the projection with the collar is sufficient for ordinary working purposes, but in the event of an obstruction to the arms *p* or *w* the projection slips idly over the adjacent face of the collar. Due to the well known action of the main punch and die on the severed blanks a rounded surface is formed on one side of the blank. To partially remove this, leaving only the portion of the blank near the edges rounded and thereby producing the appearance of an ordinary "chamfered" nut, the upper punch is formed with a shoulder and the operation of the punches is adjusted so that after the central aperture has been formed in the blank the latter is compressed between the upper end of the lower punch and the shoulder on the upper punch. The upper surface of the blank is thereby flattened over a portion corresponding to the area of the shoulder while the part near the edge is unaffected.

Machines constructed in accordance with this invention enable a rapid output of work to be obtained, and further this advantage is gained without undue complication of the mechanism, the whole being simple and such as enables durability to be readily obtained.

It will be understood that the invention is not limited to any particular details of design or construction either of the tools or the parts for operating the same as these can be modified to meet different conditions and requirements.

Having thus described my invention, what I claim as new and desire to secure by Letters Patent is:—

1. In machines for cutting metal articles such as nuts, washers and the like from metal sheets or bars, the combination comprising cutting out tools adapted to remove the articles produced in an upward direction from the original sheet or bar, and a pair of swinging arms respectively adapted to release and deliver the articles clear of the tools during the idle movements of the tools, substantially as described.

2. In machines for cutting metal articles such as nuts, washers and the like from metal sheets or bars, the combination comprising upper and lower punches, upper and lower vertical slides to which said punches are secured, a die rigidly mounted between the slides, a pair of horizontal swinging arms mounted on opposite sides of the punches, a fork piece on one of the arms adapted to pass between the lower side of the die and the upper side of the blank adhering to the upper punch and a plate on the other arm adapted to pass beneath the lower end of the upper punch, for releasing and receiving the blanks and delivering the same clear of the tools during the idle movements of the punches, substantially as described.

3. In machines for cutting metal articles such as nuts, washers and the like from metal sheets or bars, the combination comprising upper and lower punches, upper and lower slides to which said punches are secured, a die rigidly mounted between the slides, a pair of horizontal swinging arms mounted on opposite sides of the punches, levers supporting the arms, rotating elements and levers for advancing the arms toward the tools during the idle movements of the punches and withdrawing the arms during the operative movements of the punches, a fork piece on one of the arms adapted to pass between the lower side of the die and the upper side of the blank adhering to the upper punch and a plate on the other arm adapted to pass beneath the lower end of the upper punch, for releasing and receiving the blank and delivering the same clear of the tools, substantially as described.

4. In machines for cutting metal articles such as nuts, washers and the like from metal sheets or bars, the combination comprising upper and lower punches, upper and lower slides to which said punches are secured, a die rigidly mounted between the slides, a pair of horizontal swinging arms mounted on opposite sides of the punches, levers supporting the arms, rotating elements and levers for advancing the arms toward the tools during the idle movements of the punches and withdrawing the arms during the operative movements of the punches, a fork piece on one of the arms adapted to pass between the lower side of the die and the upper side of the blank adhering to the upper punch for releasing the blank, a plate pivoted on the other arm and adapted to pass beneath the lower end of the upper punch for receiving the blank, and means whereby the plate is rocked during the outward movement of the arm carrying the plate for delivering the blank clear of the tools, substantially as described.

5. In machines for cutting metal articles such as nuts, washers and the like from metal sheets or bars, the combination comprising upper and lower punches, upper and lower vertical slides to which the said punches are secured, the lower slide being formed with an opening for discharge of the portions severed from the blanks, a die rigidly mounted between the slides, cranks and shafts actuating the slides, a support for the plate or bar, a pair of horizontal swinging arms mounted on opposite sides of the punches, an operating crank disk, connecting rod and levers for each arm, both crank disks being rotated from the crank shaft of the upper slide, a fork piece on one of the arms adapted to pass between the underside of the die and the blank adhering to the upper punch and a hinged plate on the other arm adapted to pass beneath the lower end of the said punch during the idle movements of the punches, a fixed abutment piece arranged to rock the said plate during the receding movements of the arm carrying the plate, and a spring whereby the plate is restored to its normal position after disengagement from the abutment piece, substantially as described.

In testimony whereof I have signed my name to this specification in the presence of two subscribing witnesses.

FRANK MALTON.

Witnesses:
JOHN MORGAN,
KATHLEEN M. THOMPSON.